United States Patent [19]
McCanse et al.

[11] 3,774,464
[45] Nov. 27, 1973

[54] BELT DRIVEN, TRACTOR SUPPORTED IMPLEMENT

[75] Inventors: James Edson McCanse; Stephen John Gecan, both of Oregon, Ill.

[73] Assignee: Hesston Corporation, Hesston, Kans.

[22] Filed: Aug. 11, 1972

[21] Appl. No.: 279,861

[52] U.S. Cl. .................................... 74/242.1 A
[51] Int. Cl. ............................................. F16h 7/12
[58] Field of Search .............. 74/242.1 A, 242.11 R, 74/242.14 R, 252.15 R

[56] References Cited
UNITED STATES PATENTS
2,320,295   5/1943   Patterson ................. 74/242.14 R X

*Primary Examiner*—Leonard H. Gerin
*Attorney*—Gordon D. Schmidt et al.

[57] ABSTRACT

A tractor supported, rear mounted, multiple blade, rotary mower, is provided with a self-contained, belt driven power transmission utilizing a common support adapted to be carried in its entirety as well as raised and lowered as a unit by the power lift of the tractor, and driven by the power takeoff of the tractor. The power transmission includes a plurality of spaced, single groove unidirectional pulleys driven by a single continuous belt having but one arc of contact with each pulley. In certain forms of the invention, the driven pulleys and an adjacent adjustable idler pulley which is provided for maintaining the proper tension on the belt, are essentially coplanar and have their axes of rotation angularly offset relative to an upright drive pulley, coupled with the power takeoff shaft, and over which the belt is trained. One form of the invention provides for the elimination of the coplanar idler pulley adjacent the driven pulleys and relies on the adjustability of one of a pair of upright mule guide pulleys for maintaining the belt taut.

21 Claims, 9 Drawing Figures

BELT DRIVEN, TRACTOR SUPPORTED IMPLEMENT

This invention relates to a tractor-supported, multiple blade rotary mower having a belt-driven power transmission and carried rearwardly of the tractor by the latter's three-point lift. The type of mower is of the kind normally used primarily for lawn and park maintenance, and secondarily for pastures and light roadside mowing. One of the inherent problems of belt-driven transmissions, when used with mowers of this type, is the proper tensioning of the belt and alignment with its pulleys. The difficulty arises because the drive pulley in such instances has, in the past, been mounted on the tractor, whereas the driven pulleys were carried by the implement, thus making it necessary to tension and adjust the belt each time the mower is mounted on the tractor rather than having the belt properly installed on the mower and adjusted prior to delivery to the retail customer and ultimate user.

Mounting the drive pulley on the tractor rather than on the implement presents several problems. As the implement is raised and lowered by the power lift, proper alignment of the belt can not be maintained. The adjustment of the belt for tension and alignment becomes difficult and is limited to a compromise situation in which the belt is set for optimum tension at the most frequent operating position. This dividing of the transmission, part on the tractor and part on the implement, also means that each time the implement is removed from the tractor the belt alignment is lost and has to be reestablished each time the implement is remounted which is time-consuming and tends to decrease belt life because the user seldom bothers to properly reinstall the belt.

It is, therefore, an important object of this invention to provide a mower having a belt-driven power transmission that can be completely and properly assembled prior to final delivery, thus precluding the need for any field adjustments at the time of mounting on the tractor or otherwise.

It is another important object of our invention to provide a belt drive which permits the use of self-contained belt take-up and tensioning means that will insure maximum belt life.

It is a further important object of the invention to provide belt take-up and tensioning means which can be located at the most advantageous point of the belt.

It is yet another important object of this invention to provide a belt take-up and tensioning means in which an adjustable mule guide pulley not only guides the belt as it leaves the drive pulley and enters one of the driven pulleys but also serves as a part of a tensioning structure for adjusting and maintaining the tautness of the belt.

It is a still further object of the present invention to provide a belt-driven mowing implement that can be easily and quickly installed on or removed from the tractor without affecting the belt or its adjustment.

It is another object of our invention to provide a belt transmission in which the belt may be easily and quickly replaced by any unskilled user without the need for tools or the removal of any component of the implement except for safety shields.

It is yet another important object of the invention to provide a belt transmission which is compact, trouble free and remains properly tensioned and aligned.

Figure 1:
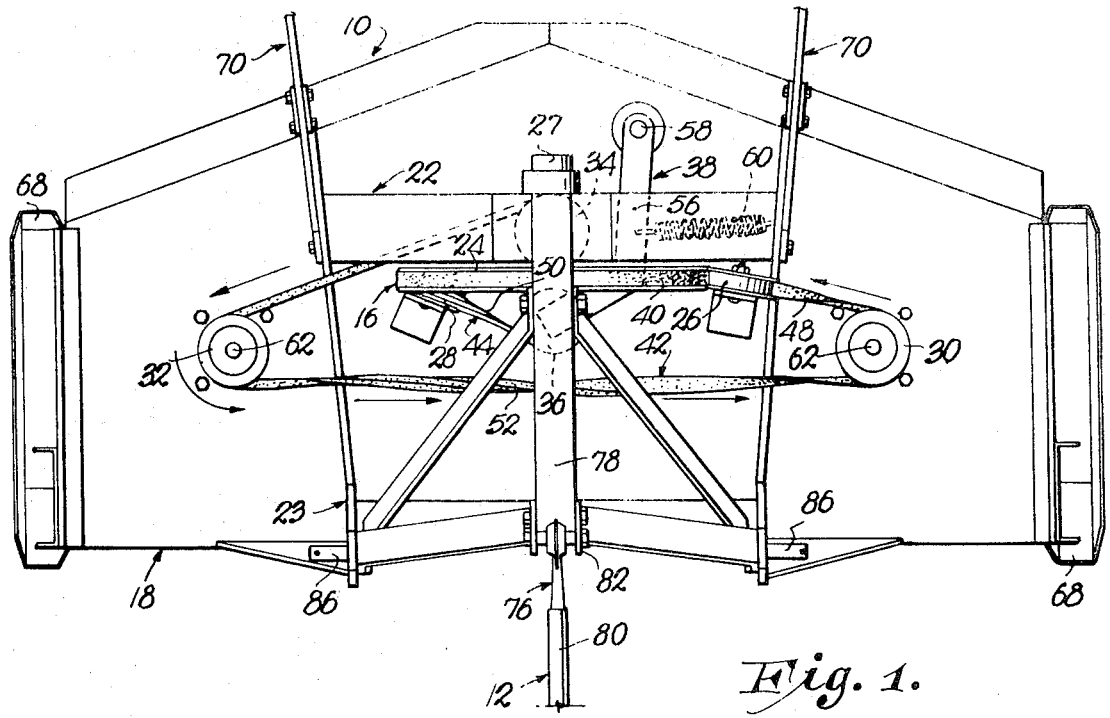
FIG. 1 is a plan view of a belt-driven, tractor-supported mower made pursuant to a first form the present invention in which a spring-loaded idler pulley is provided.
Figure 2:
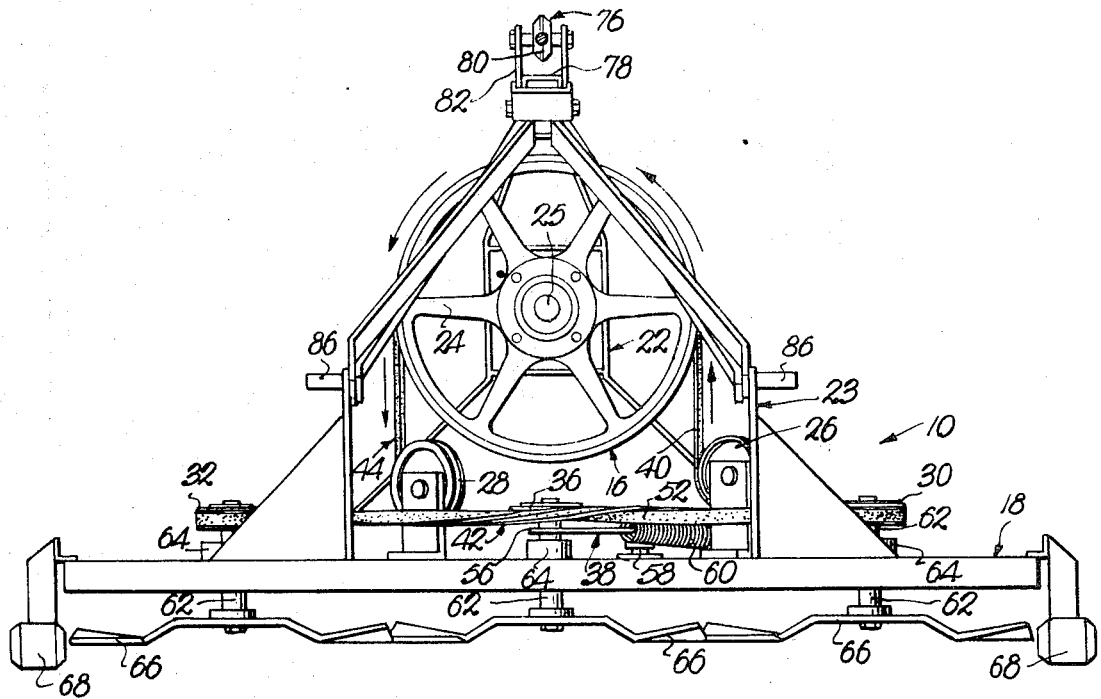
FIG. 2 is a front elevational view thereof.
Figure 3:
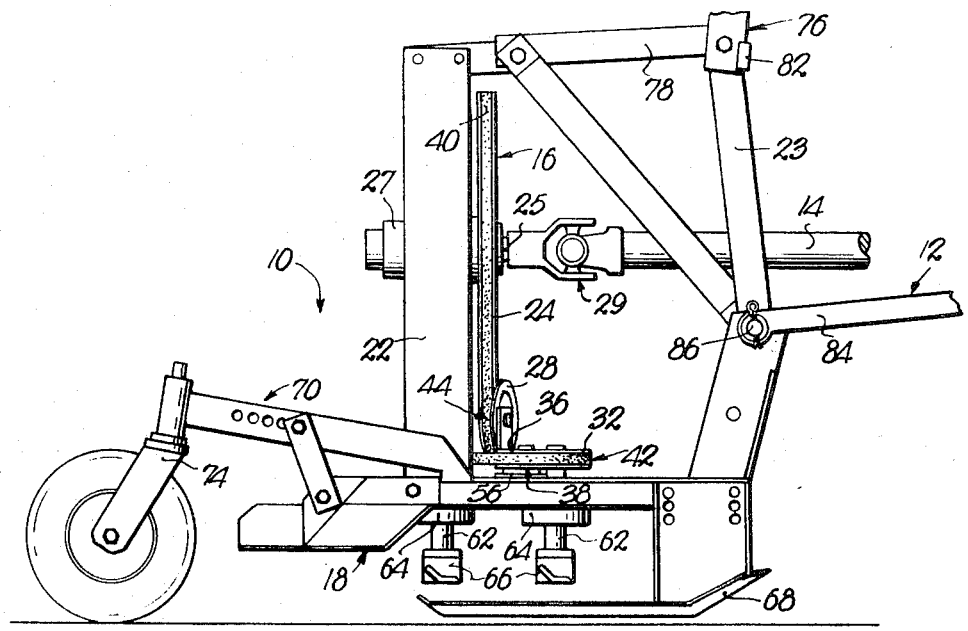
FIG. 3 is a side elevational view thereof showing portions of the power lift and power takeoff shaft of the tractor.
Figure 4:
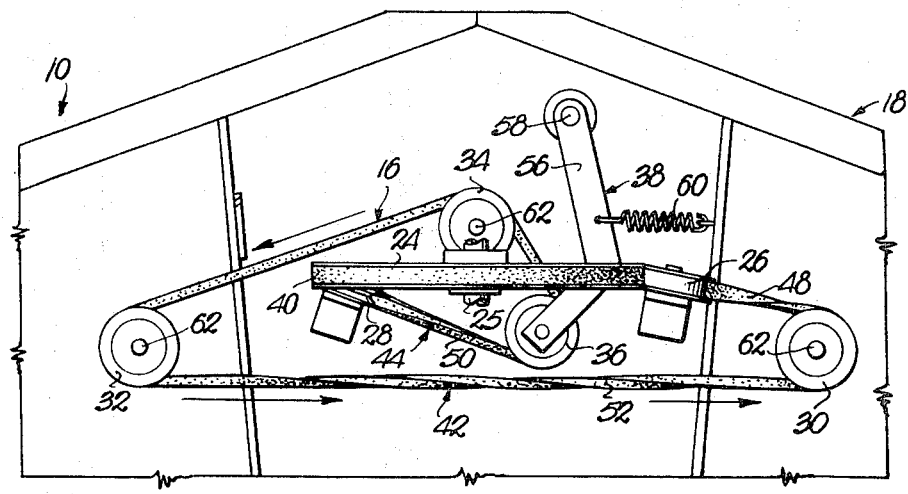
FIG. 4 is a fragmentary, slightly enlarged view similar to FIG. 1, having portions of the supporting structure removed to more clearly illustrate the transmission.

Referring initially to FIGS. 1–4, a mower 10 is adapted for use with a tractor (not shown) having a power lift 12 and a power takeoff shaft 14. Power lift 12 is of the kind commonly referred to as a three-point hitch which is hydraulically activated. The rear-mounted multiple bladed rotary mower 10 utilizes a belt-driven power transmission, broadly denoted by the numeral 16 and includes a platform 18 adapted to be carried by the power lift 12 such as to be raised and lowered by the latter and upon which is mounted a rear upright frame 22 and a front upright frame 23.

An upright drive pulley 24 is rotatably mounted on the platform 18 and has a fore and aft shaft 25 spaced above the platform 18, rotatable in a bearing 27 carried by the rear frame 22 and adapted to be releasably coupled with the shaft 14 by a universal joint 29. A pair of spaced, upright mule guide pulleys 26 and 28, respectively, rotatably mounted on the platform 18 adjacent and immediately below the drive pulley 24, and a plurality of spaced, co-planar, single-groove, unidirectionally driven pulleys, including a left driven pulley 30, a right driven pulley 32, and a rear driven pulley 34, are mounted in a triangular pattern for rotation about upright axes. It is to be understood that the left and right designations referred to throughout this specification are consistent with the normal practice of identifying components when viewing the machine from the rear and facing in the direction of travel.

A single continuous belt 40 is trained around and has but a single arc of contact with each of the pulleys 24–34 as well as an idler pulley 36, adjacent and substantially coplanar with the driven pulleys 30–34. The belt 40 includes a tight or working side 42 extending from the rear driven pulley 34, to the right driven pulley 32, to the left driven pulley 30, to the one mule pulley 26 and thence to the drive pulley 24. A return or slack side 44 of the belt 40 extends from the working side 42 at the rear driven pulley 34 to the other mule pulley 28 and thence to the drive pulley 24.

A structure 38 for maintaining the return side 44 of the belt 40 taut includes, in addition to the idler pulley 36 which engages the belt 40 between the rear driven pulley 34 and the other mule pulley 28, an arm 56 rotatably supporting pulley 36 and pivotally carried by a stub shaft 58 on the platform 18 for swinging movement of the pulley 36 within the plane of the pulleys 30, 32 and 34. The structure 38 is made yieldable by a spring 60 interconnecting the platform 18 and the arm 56.

The drive pulley 24 is elevated relative to the plane of the idler pulley 36 and the driven pulleys 30–34 and rotates within an upright plane disposed between the rear driven pulley 34 and a stretch 52 of the working side 42 of the belt 40. The idler pulley 36 is disposed between the upright plane of pulley 24 and the second stretch 52 of the belt 40 and is movable toward and away from the rear driven pulley 34. Belt 40 is trained over the drive pulley 24 and under the mule pulleys 26 and 28 in such a manner that a pair of stretches 48 and 50 are substantially parallel and extend obliquely in the same general direction from their respective mule pulleys 26 and 28.

Shafts 62 journaled in bearings 64 carried by the platform 18 are provided for the driven pulleys 30–34 and each has a cutting blade 66 attached thereto below the platform 18. A skid plate 68 is adjustably affixed at each end of the platform 18, and a pair of rearwardly extending, adjustable gauge wheel assemblies 70, each having a freely swingable, castering fork 74 (only one of which is shown), cooperate with the lift 12 to maintain the blades 66 at a predetermined height above the terrain over which the mower 10 is being operated.

A stabilizer linkage 76, forming a part of the power lift 12, extends rearwardly from the tractor to a forwardly extending arm 78 of the rear frame 22. Included in the linkage 76 is a threaded turnscrew 80 (only one end shown) which may be adjusted to maintain the platform 18 in a generally horizontal plane as the mower 10 is raised and lowered by the lift 12. A lost motion link 82, provided as a part of the linkage 76, is positioned between the turnscrew 80 and the arm 78 to permit limited, swinging movement of the mower 10, relative to the lift 12, should it strike an obstruction such as a tree stump or dirt pile. This movement must be limited, however, to avoid damaging the power shaft 14. The lift 12 also includes a pair of vertically swingable arms 84 releasably received by pintles 86 extending in opposite directions from the forward frame 23.

In operation, all that is needed in order to place the mower 10 into operation is to couple the power lift 12 and the shaft 14 thereto after which the mower may be raised for transport to the work site. It is to be noted that no connections need be made which necessitate installation, positioning or relocation of the belt 40. This arrangement of the transmission 16 makes it possible for the same to be completely installed and the belt 40 properly aligned and tensioned at the time mower 10 is originally assembled at the factory, precluding the need for any such installation, adjustment or alignment at the time the mower is attached to its carrying vehicle. Other than for the eventual replacement of the belt 40 because of age or wear, the transmission 16 need not be touched or changed once it has been correctly assembled.

This compact and unitized transmission 16 is therefore, highly advantageous in that the relative relationship and positioning of the various pulleys 24–36 can be so arranged that the belt 40 may be ideally aligned therewith. The alignment and tensioning are properly maintained at all times, regardless of load variances or changes in the relative positions of the mower 10 and the tractor such as when working on uneven terrain or during raising and lowering by the lift 12.

The arrangement of the belt 40 is most conducive to an efficient, trouble-free, long life because of its single, adequate arc of contact with each driven pulley 30–34 which minimizes slippage of the belt 40 relative to the pulleys 30–34. Such arrangement of the belt 40 further permits the tensioning structure 38 to be located on the return side 44 of the belt 40, such positioning being the ideal location for a yieldable tensioning means as well as being condusive to maximum belt life.

Figure 5:
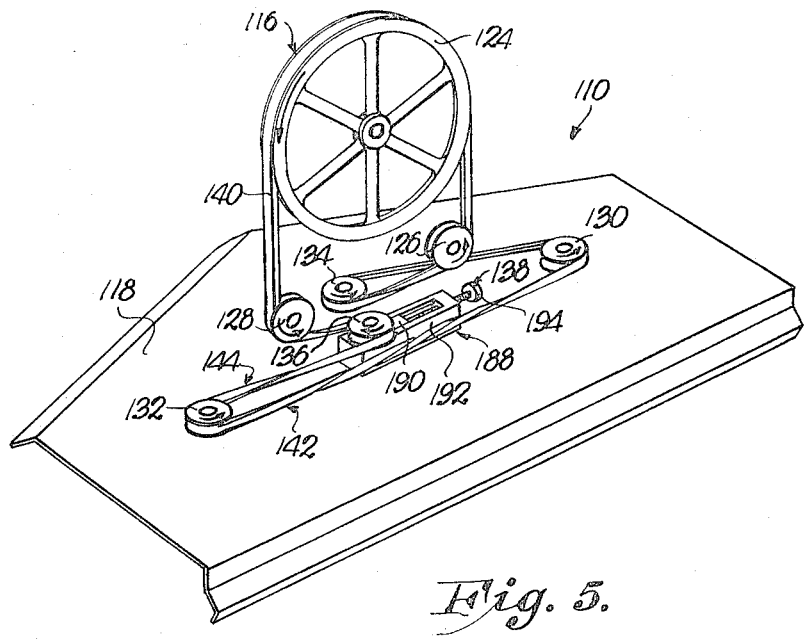
FIG. 5 is a slightly elevated, front and side perspective view schematically showing an alternate form the belt transmission as it would appear mounted on the mower platform.

In FIG. 5 there shown an alternate transmission 116 mounted on a platform 118 of a mower 110. The transmission 116 includes a left driven pulley 130, a right driven pulley 132, a rear driven pulley 134 and a drive pulley 124 all of which are arranged in substantially the same relative configuration with respect to the platform 118 as their corresponding counter parts in the previously described form. A belt tightening structure 138 mounted on the platform 118 includes an idler pulley 136 carried by an adjustable mounting assembly 188 for holding the pulley 136 in any one of a number of preselected, fixed positions. The assembly 188 may be of any type commonly used for such purposes such as mounting block 190 slidably positioned within a bracket 192 and adjustably held by a threaded bolt 194. A pair of spaced, upright mule guide pulleys 126 and 128 are rotatably mounted on the platform 118 in the same manner as described earlier with one mule pulley 126 being positioned adjacent the left driven pulley 130 and the other mule pulley 128 being positioned adjacent the right driven pulley 132.

A belt 140 is trained about the pulleys 124–136 and has a working side 142 extending from the right driven pulley 132, to the left driven pulley 130, to the rear driven pulley 134 and thence to the one mule pulley 126. A return side 144 extends from the right driven pulley 132 to the idler pulley 136 and thence to the other mule pulley 128. As will be noted by the arrows when comparing FIGS. 4 and 5, it is apparent that in both forms the drive pulley is rotating in a clockwise direction when viewed from the rear and the driven pulleys rotate in a counterclockwise direction when viewed from above. The configuration shown in FIG. 5, which is possible because of the positioning of the structure 138 to permit shifting of the idler pulley 136 along a line extending substantially between the left and right driven pulleys 130 and 132 respectively, allows for appreciably more belt take-up than does the form shown in FIGS. 1–4. Aside from the increased belt takeup possible in this form the attributes and advantages previously described apply equally to this form.

Figure 6:
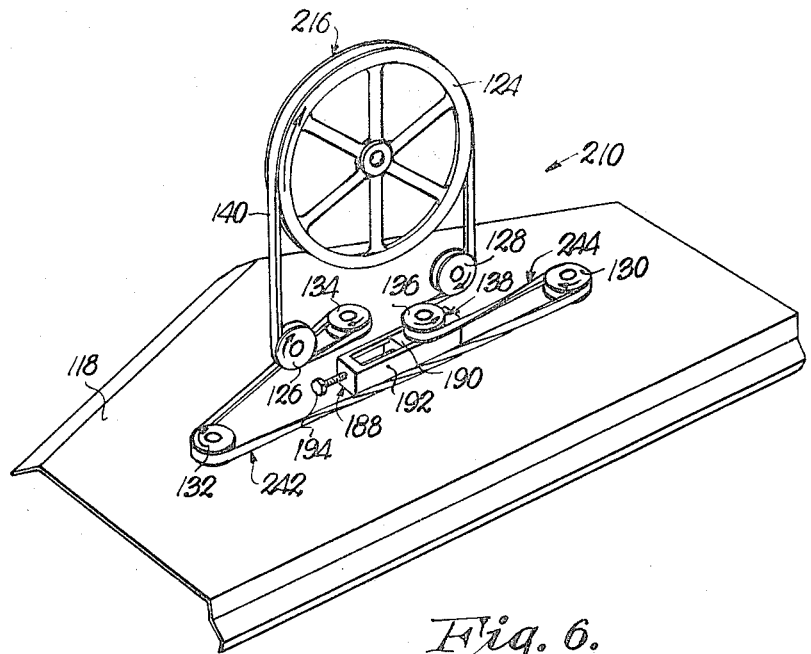
FIG. 6 is a view similar to that of FIG. 5 showing a third alternate form of the invention in which the transmission is in a "mirror image" configuration to that of FIG. 5.

In FIG. 6 there is shown a mower 210 having a transmission 216 in which the components are identical to those shown in FIG. 5, the only difference being that they are arranged in a "mirror image" to that of the arrangement shown in FIG. 5. Inasmuch as the components are the same, like numerals serve to identify like elements; this also being the case where applicable in the description of FIGS. 7–9.

In this particular arrangement a working side 242 of the belt 140 extends from the left driven pulley 130, to the right driven pulley 132, to the rear driven pulley 134 and thence to the one mule pulley 126 while a return side 244 extends from the left driven pulley 130 to the idler pulley 136 and thence to the other mule pulley 128. From the forgoing it will be readily recognized that by the mere rearrangement of the basic components of the transmission that the mower may be readily adapted to be used with tractors having either clockwise or counterclockwise rotating power takeoffs as well as adapting the mower to have either right or left hand discharge, this being controlled by the direction of rotation of the driven pulleys.

Figure 7:
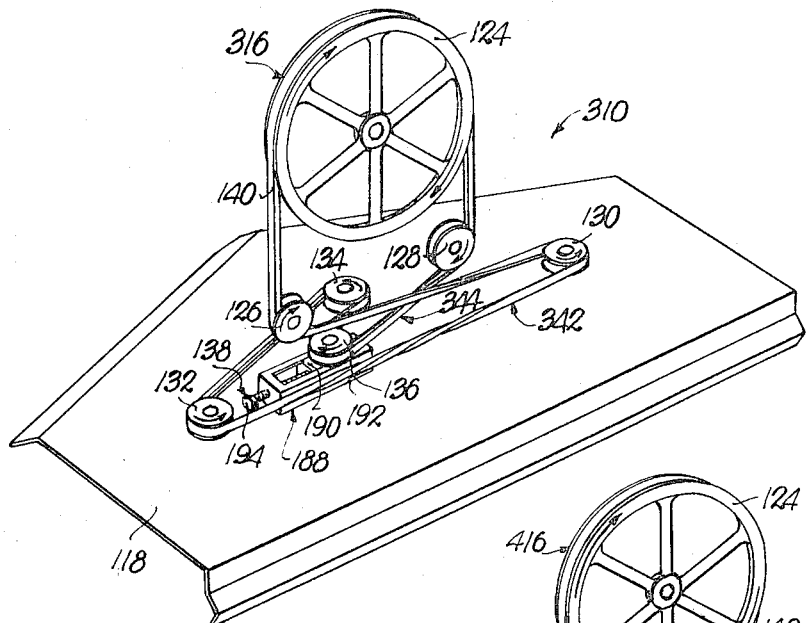
FIG. 7 is a view similar to that of the FIGS. 5 and 6 showing a fourth alternate form of the invention.

In FIG. 7 there is illustrated a mower 310 having a transmission 316 in which the various individual components are again the same as those utilized in the forms shown in FIGS. 5 and 6, however, in this instance they are arranged in a configuration whereby the direction of rotation of the drive pulley 124 and the rotation of the driven pulleys 130–134 are in the same direction, namely counterclockwise, whereas in the previously described forms, the direction of rotation of the driven pulleys is opposite to that of the drive pulley.

The belt 140 has a working side 342 extending from the rear driven pulley 134, to the right driven pulley 132, to the left driven pulley 130 and thence to the one mule pulley 126 and a return side 344 extending from the rear driven pulley 134, to the idler pulley 136 and thence to the other mule pulley 128.

Figure 8:
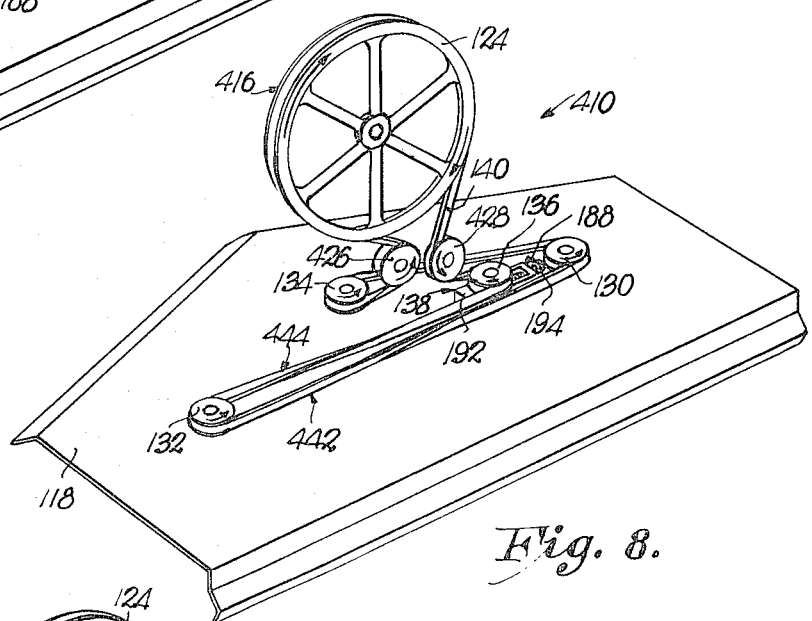
FIG. 8 is a view similar to that of FIGS. 5—7 showing a fifth alternate form of the invention.
Figure 9:
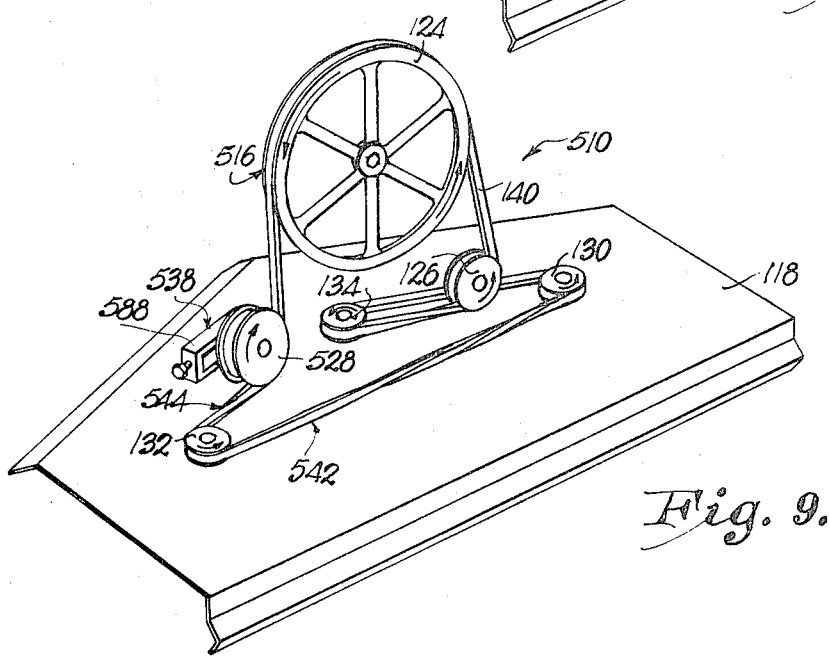
FIG. 9 is a view similar to that of FIGS. 5–8 showing yet a sixth alternate form of the invention in which one of the mule guide pulleys is utilized as a part of the belt tightening structure.

It is to be noted that in this form, as in the forms shown in FIGS. 5 and 6 as well as the succeeding forms shown in FIGS. 8 and 9, the belt tightening structure is adjustable to any one of a number of preselected, fixed positions in order to vary the tension of the belt 140. As the belt 140 stretches through use or if for some reason the cutting becomes increasingly difficult to the point that there is excessive slippage of the belt on either the driven or drive pulleys an operator may increase the tension on the belt by moving the idler pulley 136 in the direction of the bolt 194. Likewise if it is determined that the tension is too great on the belt 140 the idler pulley may be shifted in the opposite direction to relieve some of the tension on the belt.

Upon refrence to FIG. 8 it will be noted that a mower 410 is provided with a transmission 416 in which the components are again identical to those utilized in the forms presented in FIGS. 5–7 with the exception of the mule guide pulleys which, in this instance, are both of the flat groove type for engagement with the back side of the belt 140 as compared to the V-groove which engage the inside of the belt. The belt has a working side 442 extending from the right driven pulley, to the left driven pulley 130, to the rear driven pulley 134 and thence to a first mule pulley 426 while a return side 444 extends from the right driven pulley 132 to and around the idler pulley 136 and thence to another mule pulley 428. In this instance as in the just previously described forms shown in FIGS. 5-7 the belt tightening structure 138 is again employed, it being noted that the configuration of the belt 140 by virtue of the arrangement of the components on the platform 118 provides for the counterclockwise rotation of the driven pulleys 130-134 in conjunction with the counterclockwise rotation of the drive pulley 124.

This particular arrangement provides for an increased wrap of the belt 140 on the drive pulley 124 as compared to the forms of the drive shown in the other FIGS. The increased wrap can be very advantageous in those situations where the mower 410 is to be used with a tractor having a relatively slow rpm output at its power takeoff making it desirable to have added wrap on the drive pulley to prevent slippage of the belt, particularly during heavy cutting. The adaptability and versatility of the mower is clearly shown in that with only the substitution of the flat mule guide pulleys the components are the same as those used for the other forms of the transmission.

FIG. 9 illustrates a mower 510 having a transmission 516 in which a working side 542 of the belt 140 extends from the right driven pulley 132, to the left driven pulley 130, to the rear driven pulley 134 and thence to the one mule pulley 126. A return side 544 extends from the right driven pulley 132 to a belt tightening structure 538 that includes means in the nature of an adjustable mounting assembly 588, of a type similar to that shown in FIGS. 5–7 for holding a mule pulley 528 in any one of a number of preselected, fixed positions to vary the tension of the belt 140. In this particular instance the other mule guide pulley 528 would be of the flat groove type for engagement with the back side of the belt 140.

Noteworthy in this instance is the ability to achieve and maintain proper alignment of the belt 140 with the pulleys 124–134 throughout the range of adjustment by using only the two mule guide pulleys without the need for an additional idler pulley. In this particular form it is important that the drive pulley 124 be essentially in line with the rearmost edge of the left driven pulley 132 so that the alignment of the belt 140 therewith is not changed as the pulley 528 is moved sideways for adjusting the tension of the belt.

It is to be recognized that in each and every form of the invention shown that an opposite blade rotation may be obtained by the use of a "mirror image" arrangement of the pulley mountings in conjunction with an oppositely rotating power takeoff on the mounting vehicle. Also, while not specifically mentioned in the description of each of the forms of the invention the type of tensioning structure for maintaining the belt taut is optional and may be either of the spring loaded type as shown in the form disclosed in FIGS. 1–4 or of the kind in which the idler pulley is positionable in any number of preselected fixed locations as shown in FIGS. 5–9.

A significant feature of the invention which is not to be overlooked is the ability to provide a mower having essentially identical components which may be arranged in any number of configurations to provide the direction of rotation desired for the discharge from the mower blades regardless of the direction of rotation of the power-takeoff of the tansporting vehicle. Even though great strides have been made in the agricultural and industrial tractor industry to standardize power-takeoff speeds as well as direction of rotation there is still some variation from one manufacturer to another that has made it heretofor rather difficult to provide a mower that may be universally attached to any one of the tractors without having to more or less custom fit the mower drive to the particular tractor to which the mower is to be attached. The present invention not only eliminates the inconvenient and highly undesirable need to dismantle the transmission upon removal of the mower from the tractor thereby negating the need for realignment and readjustment of the belt and pulleys each time the mower is reinstalled but also makes it possible to reduce the number of components needed to suitably adapt and mount the mower to any one tractor.

Another feature not to be overlooked is the fact that it is now possible for the mower manufacturer to appreciably reduce his tooling, stock of parts and inventory of finished mowers while still being in a position to satisfy the mounting requirements for the various tractors.

Having thus described the invention, what is claimed as new and desired to be secured by Letters Patent is:

1. For use with a tractor having a power lift and a power take-off drive shaft at the rear thereof, a mower including:
    a platform adapted to be carried by said power lift such as to be raised and lowered by the latter;
    an upright drive pulley rotatably mounted on the platform above the latter, having a fore and aft axis and adapted to be coupled with said shaft;
    a pair of spaced, upright mule guide pulleys rotatably mounted on the platform between the latter and said drive pulley;
    a plurality of spaced, coplanar, single groove, unidirectional driven pulleys mounted on the support above the latter for rotation about upright axes;
    a single, continuous belt trained around said pulleys and having a single arc of contact with each pulley respectively,
    said belt having a working side and a return side,
    the working side extending from around all of the driven pulleys to one of the mule pulleys, and thence to the drive pulley,
    the return side extending from the working side to the other mule pulley, and thence to the drive pulley; and
    structure for maintaining the belt taut.

2. A mower as claimed in claim 1 wherein said structure is located to maintain the return side of the belt taut.

3. A mower as claimed in claim 1 wherein said structure includes means for holding said other mule pulley in any one of a number of preselected, fixed positions to vary the tension of the belt.

4. A mower as claimed in claim 1 wherein said structure includes an idler pulley around which the belt is trained.

5. A mower as claimed in claim 4 wherein said idler pulley is spring loaded.

6. A mower as claimed in claim 4 wherein is provided means for holding the idler pulley in any one of a number of preselected, fixed positions to vary the tension of the belt.

7. A mower as claimed in claim 1 wherein said driven pulleys include a left, a right and a rear pulley, said working side extending from the rear driven pulley, to the right driven pulley, to the left driven pulley and thence to said one mule pulley.

8. A mower as claimed in claim 1 wherein said driven pulleys include a left, a right and a rear pulley, said working side extending from the left driven pulley, to the right driven pulley, to the rear driven pulley and thence to said one mule pulley.

9. A mower as claimed in claim 8 wherein said return side extends from said left driven pulley to said other mule pulley.

10. A mower as claimed in claim 9 wherein said structure includes an idler pulley engaging said return side between said left driven pulley and said other mule pulley.

11. A mower as claimed in claim 7 wherein said return side extends from said rear driven pulley to said other mule pulley.

12. A mower as claimed in claim 11 wherein said structure includes an idler pulley engaging said return side between said rear driven pulley and said other mule pulley.

13. A mower as claimed in claim 12 wherein said idler pulley is spring loaded.

14. A mower as claimed in claim 12 wherein is provided means for holding the idler pulley in any one of a number of preselected, fixed positions to vary the tension of the belt.

15. A mower as claimed in claim 1 wherein said driven pulleys include a left, a right and a rear pulley, said working side extending from the right driven pulley, to the left driven pulley, to the rear driven pulley and thence to said one mule pulley.

16. A mower as claimed in claim 15 wherein said return side extends from said right driven pulley to said other mule pulley.

17. A mower as claimed in claim 16 wherein said structure includes means for holding said other mule pulley in any one of a number of preselected, fixed positions to vary the tension of the belt.

18. A mower as claimed in claim 16 wherein said structure includes an idler pulley engaging said return side between said right driven pulley and said other mule pulley.

19. A mower as claimed in claim 18 wherein is provided means for holding the idler pulley in any one of a number of preselected, fixed positions to vary the tension of the belt.

20. A mower as claimed in claim 18 wherein said one mule pulley is adjacent the left driven pulley and said other mule pulley is adjacent the right driven pulley.

21. A mower as claimed in claim 18 wherein said one mule pulley is adjacent the right driven pulley and said other mule pulley is adjacent the left driven pulley.

* * * * *